US010289774B1

(12) United States Patent
Yadav et al.

(10) Patent No.: US 10,289,774 B1
(45) Date of Patent: May 14, 2019

(54) SYSTEMS AND METHODS FOR REUSE OF DELAY CALCULATION IN STATIC TIMING ANALYSIS

(71) Applicant: Cadence Design Systems, Inc., San Jose, CA (US)

(72) Inventors: Pradeep Yadav, Greater Noida (IN); Ratnakar Goyal, Delhi Cantt (IN); Prashant Sethia, Noida (IN); Manuj Verma, Ghaziabad (IN)

(73) Assignee: Cadence Design Systems, Inc, San Jose, CA (US)

( * ) Notice: Subject to any disclaimer, the term of this patent is extended or adjusted under 35 U.S.C. 154(b) by 58 days.

(21) Appl. No.: 15/474,733

(22) Filed: Mar. 30, 2017

(51) Int. Cl.
*G06F 17/50* (2006.01)

(52) U.S. Cl.
CPC ...... *G06F 17/5031* (2013.01); *G06F 2217/06* (2013.01)

(58) Field of Classification Search
CPC .............. G06F 17/5031; G06F 2217/06
See application file for complete search history.

(56) References Cited

U.S. PATENT DOCUMENTS

| 7,231,626 | B2* | 6/2007 | Hoff | G06F 17/5045 716/112 |
| 8,413,095 | B1* | 4/2013 | Dubuque | G06F 17/504 716/108 |
| 8,543,954 | B1* | 9/2013 | Keller | G06F 17/5031 703/14 |
| 8,788,995 | B1* | 7/2014 | Kumar | G06F 17/5031 716/110 |
| 9,529,962 | B1* | 12/2016 | Dhuria | G06F 17/5031 |
| 9,542,524 | B2* | 1/2017 | Gregerson | G06F 17/5081 |
| 9,875,333 | B1* | 1/2018 | Verma | G06F 17/5081 |
| 2004/0199879 | A1* | 10/2004 | Bradfield | G06F 17/5045 716/113 |
| 2005/0172250 | A1* | 8/2005 | Kucukcakar | G06F 17/5031 716/113 |
| 2008/0216035 | A1* | 9/2008 | Dirks | G06F 17/5031 716/113 |
| 2009/0125858 | A1* | 5/2009 | Vishweshwara | G06F 17/5031 716/113 |
| 2010/0077368 | A1* | 3/2010 | Papa | G06F 17/5031 716/113 |
| 2010/0281445 | A1* | 11/2010 | Soviani | G06F 17/5045 716/113 |
| 2011/0307850 | A1* | 12/2011 | Dartu | G06F 17/5031 716/108 |
| 2012/0144353 | A1* | 6/2012 | Kamdar | G06F 17/5031 716/108 |
| 2012/0159415 | A1* | 6/2012 | Hannan | G06F 17/5031 716/113 |
| 2013/0185685 | A1* | 7/2013 | Thoziyoor | G06F 17/5031 716/108 |
| 2016/0357894 | A1* | 12/2016 | Frederick, Jr. | G06F 17/5031 |
| 2017/0004244 | A1* | 1/2017 | Paik | G06F 17/5081 |
| 2017/0124236 | A1* | 5/2017 | Srimal | G06F 17/5031 |
| 2017/0147737 | A1* | 5/2017 | Huang | G06F 17/504 |

* cited by examiner

*Primary Examiner* — Nha T Nguyen

(74) *Attorney, Agent, or Firm* — Schwegman Lundberg & Woessner, P.A.

(57) ABSTRACT

Various embodiments describe performing static timing analysis (STA) on a circuit design such that delay timing calculation results generated by an STA on the circuit design can be reused by subsequent STAs on the circuit design in place of performing a set of delay timing calculations on the circuit design.

20 Claims, 11 Drawing Sheets

200

202 Store Delay Calculation Data Generated by a First Static Timing Analysis (STA) Performed on a Circuit Design, the First STA Including Performing a Full Delay Calculation on the Circuit Design 204 Perform a Second STA on a Modified Version of the Circuit Design, the Second STA Including Performing a Non-Full Delay Calculation on the Modified Version Based on the Stored Delay Calculation Data

200

202 — Store Delay Calculation Data Generated by a First Static Timing Analysis (STA) Performed on a Circuit Design, the First STA Including Performing a Full Delay Calculation on the Circuit Design

204 — Perform a Second STA on a Modified Version of the Circuit Design, the Second STA Including Performing a Non-Full Delay Calculation on the Modified Version Based on the Stored Delay Calculation Data

FIG. 2

SYSTEMS AND METHODS FOR REUSE OF DELAY CALCULATION IN STATIC TIMING ANALYSIS

TECHNICAL FIELD

Embodiments described herein relate to electronic design automation (EDA), and to systems, methods, devices, and instructions for re-using delay calculation in Static Timing Analysis (STA).

BACKGROUND

Electronic design automation (EDA) is a category of software systems for assisting with the design of electronic systems and devices. Timing analysis is an EDA function for analyzing timing of circuit elements and/or circuit blocks to verify whether a digital circuit meets expected constraints and operational clock rates.

As part of timing analysis, static timing analysis (STA) uses models that describe characteristics of a digital circuit (e.g., library models, parasitic models, timing derates, standard delay format, system constraints, delay calculation, slack, timing reports, and multimode multi-corner analysis) to compute an expected time of the digital circuit and to do so without requiring simulation of the entire digital circuit, which can be resource intensive. A design team generally uses STA to determine whether various clocks and signals within a circuit design are correctly implemented, which can determine whether a circuit will operate as planned or even function.

STA is usually performed over a set of varying conditions (e.g., temperature variations, voltage variations, parameters for a resistor-capacitor [RC] reduction) and determines best- and worst-case timing delays of the digital circuit independent of its inputs (e.g., based on interference effects of neighboring aggressor nets on victim nets). Analyzing a circuit design under a given set of conditions may be defined by a view. An example view can include, without limitation, an RC corner identifying a set of parameters for RC reduction, a library file, a mode for simulating a condition (e.g., low-power or high-temperature condition), or a case selection (e.g., maximum delay, minimum delay, average delay, etc.).

Before a circuit design tapeout, STA is usually performed on a design multiple times (i.e., multiple STA runs) until timing signoff verification is achieved. Some of these STA runs can be performed within a single analysis session with some changes to either settings or constraints, or by application of engineering change orders (ECOs) (e.g., an ECO to fix a timing violation or a design rule violation [DRV]), all of which may impact a small section of the circuit design from a timing delay perspective.

Unfortunately, timing signoff can be a time-consuming exercise during STA when a delay calculation of all the stages/nets of a digital circuit design is performed for each STA run.

BRIEF DESCRIPTION OF THE DRAWINGS

Various ones of the appended drawings merely illustrate example embodiments of the present disclosure and should not be considered as limiting its scope.

FIGS. 2-5 are flowcharts illustrating example methods for STA with reuse of prior delay calculation results, according to some embodiments.

DETAILED DESCRIPTION

Figure 1:
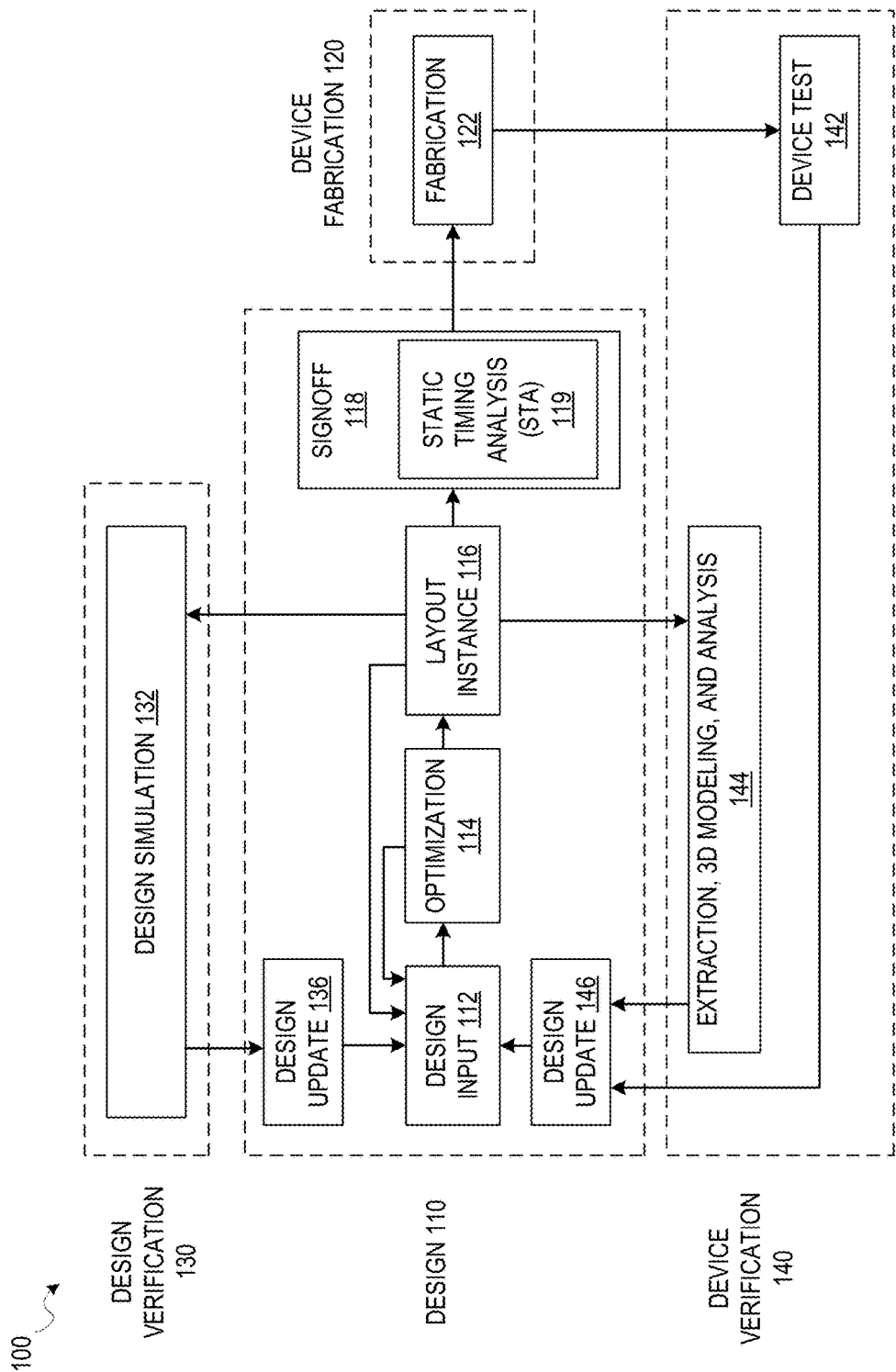
FIG. 1 is a diagram illustrating an example design process flow for producing a circuit based on timing analysis that uses static timing analysis (STA) with reuse of prior delay calculation results, according to some embodiments.

As noted herein, static timing analysis (STA) is traditionally performed on a design multiple times (multiple STA runs) until timing signoff verification is achieved. Embodiments described herein relate to electronic design automation (EDA) and to systems, methods, devices, instructions, and computer media for re-using delay calculation values across multiple STA runs. By re-using delay calculation values across multiple STA runs, various embodiments reduce the number of full delay timing calculations and updates needed during a given STA run. In particular, for some embodiments, after an initial delay calculation of all the stages/nets of a circuit design (e.g., during a first STA run), subsequent delay timing calculations/updates (e.g., during a subsequent STA run) leverage delays computed by an earlier delay timing calculation/update. The prior-computed delays may be leveraged such that the subsequent delay timing calculations/updates (hereafter, "delay timing calculations" or "delay calculations") are performed only on portions (e.g., stages) of the circuit design having a delay timing affected by changes (e.g., portions affected by setting changes, constraint value changes, or application of engineering change orders [ECOs]).

According to some embodiments, a full delay timing calculation (hereafter, "full delay calculation"), such as a full signal-integrity (SI) delay calculation, is performed on a circuit design during a first STA run, and delay calculation data (e.g., describing delay calculation results) generated by the first STA run is saved on a data storage device (e.g., in a binary data structure). A subsequent STA run may be performed on the circuit design after a design change (e.g., setting change, constraint value change, ECO, etc.) has been applied to the circuit design, which results in a modified version of the circuit design. For such subsequent STA runs (performed on modified versions of the circuit design), delay calculation data stored or updated by a previous STA run can be reused in place of performing delay calculations on certain stages of the modified version of the circuit design, such as stages not impacted by a design change implemented since the previous STA run. A subsequent STA run would perform delay calculations for those stages of the modified version of the circuit design impacted by a design change implemented since the previous STA run. Each STA run after the first STA run can update the stored delay calculation data based on its delay calculation results, thereby maintaining updated delay calculation data for reuse by the next STA run.

Accordingly, reuse of prior delay calculation results (e.g., containing delay calculation values as described herein) can obviate the need to perform a full delay calculation in certain situations for an STA run performed on a circuit design. By reducing the number of full delay timing calculations/updates performed during STA runs, the timing verification during signoff for a circuit design can be sped up (e.g., timing verification runtime reduced). Additionally, by reusing delay calculation values previously calculated and preserved, certain STA runs (e.g., successive STA runs) can achieve the accuracy of a full delay timing calculation/update in a fraction of the runtime.

While certain embodiments are discussed with respect to STA being performed during circuit design signoff, it will be apparent that other embodiments not specifically described herein, including embodiments using STA performed at any stage of a circuit design, are possible.

STA in accordance with various embodiments may be suitable, and save on STA runtime, for different scenarios. For instance, an STA (executing a set of delay calculations) according to an embodiment may be performed on a circuit design when analyzing and fixing a timing violation or a design rule violation (DRV) of the circuit design. In another instance, an STA according to an embodiment may be performed on a circuit design when applying different derate values, such as a derate value for testing setup timing of the circuit design, for testing hold timing of the circuit design, or for testing particular instance or net. More regarding these scenario instances is described below with respect to FIGS. 6 and 7.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for producing a circuit based on timing analysis that uses STA with reuse of prior delay calculation results, according to some embodiments. In particular, the design process flow 100 includes design process flows for timing and SI analysis to generate a circuit design (of the circuit) in accordance with various example embodiments. It will be apparent that other design process flow operations may function using the timing analysis processes described herein, but the design process flow 100 is described here for the purposes of illustration. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, timing analysis and optimization are performed in an optimization 114 operation, along with any other automated design processes. Additionally, design constraints for blocks of a circuit design generated with design inputs in the design input 112 operation may be analyzed using timing analysis. While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout. During the signoff 118, a final signoff optimization or verification is performed on the circuit design, which involves running a static timing analysis (STA) 119 on the circuit design. The STA 119 can be performed in accordance with embodiments described herein. Based on results of the STA 119, one or more ECOs may be applied to the layout, and the STA 119 rerun, until timing verification is achieved.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the optimization 114 operation may be performed. Such timing analysis may involve STA in accordance with an embodiment described herein.

FIGS. 2-5 are flowcharts illustrating example methods for STA with reuse of prior delay calculation results, according to some embodiments. It will be understood that example methods described herein may be performed by a device (e.g., an EDA computing device executing EDA instructions) in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates an example method 200 for STA with reuse of prior delay calculation results, according to some embodiments. For some embodiments, the method 200 is performed as part of an STA session being performed on a circuit design by a timing analysis tool. An operation of the method 200 (or another method described herein) may be performed by a hardware processor (e.g., central processing unit or graphics processing unit) of a computing device (e.g., desktop, server, etc.).

The method 200 as illustrated begins under the presumption that a first STA has already been performed on a circuit design (e.g., performed during an STA session). It will be understood that an STA as used herein may be performed by a hardware processor. For some embodiments, the first STA is the initial STA performed on the circuit design during a particular STA session. The first STA includes performing a full delay calculation on the circuit design. As used herein, a delay calculation can comprise an SI delay calculation. For some embodiments, the full delay calculation of the first STA is an iterative process that comprises a first delay calculation iteration and a set of successive delay calculation iterations that follow the first delay calculation iteration. In such embodiments, the first delay calculation iteration may use an initial timing window to calculate delay timing of the circuit design, while each successive delay calculation iteration may use a timing window more refined than its preceding iteration to calculate delay timing of the circuit design. More regarding the iterative process is described and illustrated herein with respect to FIGS. 4 and 5.

When performing timing analysis of a circuit design, a timing analysis tool may err on the side of pessimism and overestimate a noise (rather than take the risk of underestimating a potential point of failure) for signal crosstalk analysis purposes. A timing window may be used by a timing analysis tool to control and reduce that pessimism. In particular, a timing window can define a window in which aggressor nets within a circuit design cannot typically attack (e.g., cause noise due to coupling) a victim net in the circuit design at the same time. Only those aggressor nets that have switching activities in the window defined by the timing window can potentially attack a victim net at the same time. The effect of crosstalk on delay may only be seen when the victim is switching, when there is some sort of overlap between the victim's and aggressor's, or set of aggressors', timing windows. Timing windows can factor in effects of process variations on a circuit design.

Subsequent to the first STA being performed on the circuit design, the method 200 begins with operation 202 storing delay calculation data generated by the first STA (e.g., on a data storage device), where (as noted above) the first STA includes performing a full delay calculation on the circuit design. The delay calculation data generated by the first STA may comprise, for example, delay information, slew information, sensitivity information, and waveform information. This information may be in the form of numerical values. The foregoing information may be generated and stored with respect to each pin of the circuit design, with respect to each arc of the circuit design, and with respect to each view under which the circuit design is being analyzed. As used herein, a view can include at least one of a resistor-capacitor (RC) corner identifying a set of parameters for RC reduction, a library file, a mode for simulating a condition (e.g., low-power or high-temperature condition), or a case selection (e.g., maximum delay, minimum delay, average delay, etc.).

The method 200 continues with operation 204 performing a second STA on a modified version of the circuit design, where the second STA includes performing a non-full delay calculation on the modified version of the circuit design based on the delay calculation data stored at operation 202. The second STA may represent the first time an STA is performed on the circuit design since the first STA was performed. Between the first STA and the second STA, the circuit design may be modified in a variety of ways. As used herein, a modified version of a circuit design may result from applying to the circuit design a set of ECOs (e.g., to fix timing or recover leakage), or applications of different derate values (e.g., one for testing hold timing and another for testing setup timing). As used herein, a derate value may be applied to a circuit design to model the impact of silicon fabrication process variation on the circuit design timings (e.g., hold or setup timing).

For some embodiments, operation 204 performs the non-full delay calculation on the modified version of the circuit design by performing delay calculations on a set of invalidated stages of the modified version of the circuit design having at least one invalid pin or port. For all remaining stages of the modified version of the circuit design, operation 204 may reuse the delay calculation data stored on a data storage device at operation 202. For instance, for a particular remaining stage of the modified version of the circuit design, operation 204 may utilize delay calculation results generated by the first STA, stored in the delay calculation data and associated with the particular remaining stage, in place of performing a delay calculation on the particular remaining stage.

The set of invalidated stages of the modified version of the circuit design may be identified by an operation performed after the first STA (e.g., after a set of modifications have been applied to the circuit design). The set of invalidated stages may comprise those containing a net for which the delay timing analysis provided by the first STA is impacted or invalidated by virtue of the modifications applied to produce the modified version of the circuit design. Depending on the embodiment, a stage of a circuit design invalidated by a modification may include at least one of: a first type of stage modified by an ECO process; a second type of stage in a fan-in of another stage modified by an ECO process; a third type of stage including a port or pin for which an input transition constraint is modified; a fourth type of stage coupled to a net of at least one of the first type of stage, the second type of stage, or the third type of stage; or a fifth type of stage in a fan-out (e.g., fan-out cone) of at least one of the first type of stage, the second type of stage, or the third type of stage. Additionally, for some embodiments, not all stages in the set of invalidated stage may need to be recomputed by a full delay calculation operation. For instance, for a stage of the fifth type (as described above) experiencing slew-stabilization (e.g., not experiencing a change in input slew), the delay calculation data stored at operation 202 may be used in place of re-computing the delay timing of the stage by performing a delay calculation.

Figure 3:
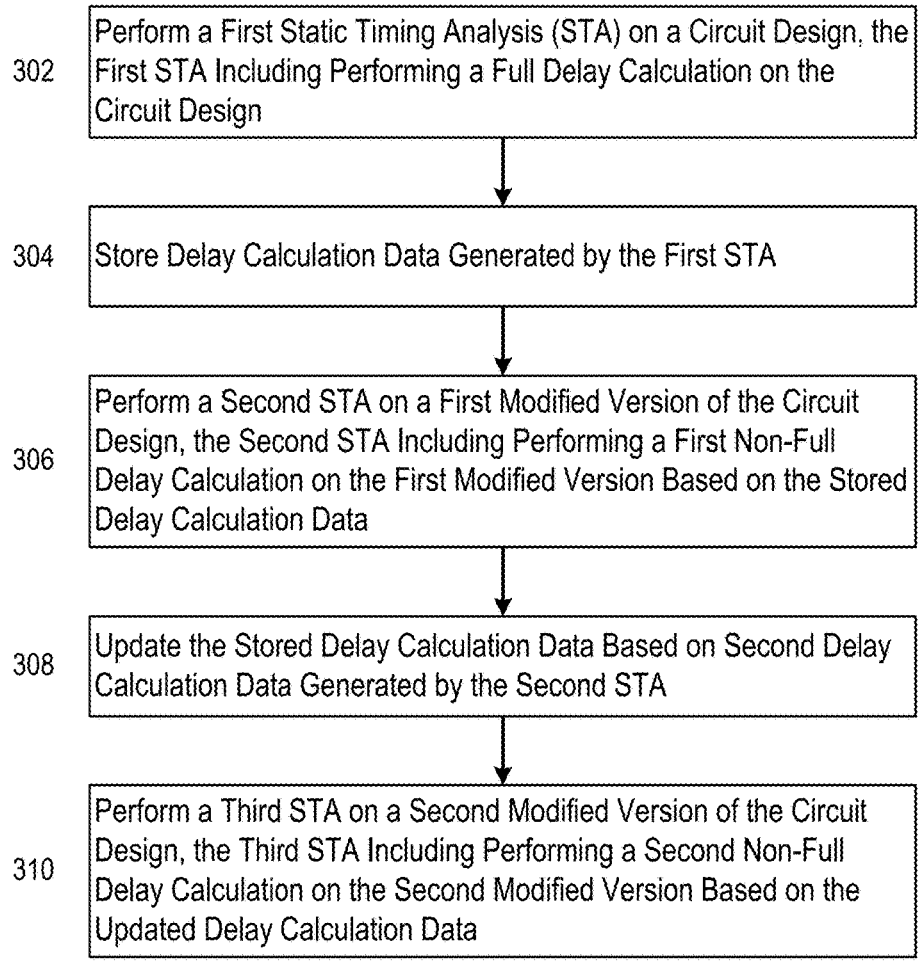

Referring now to FIG. 3, the flowchart illustrates an example method 300 for STA with reuse of prior delay calculation results, according to some embodiments. Like the method 200 of FIG. 2, the method 300 may be performed as part of an STA session being performed on a circuit design by a timing analysis tool. An operation of the method 300 may be performed by a hardware processor of a computing device.

As shown, the method 300 begins with operation 302 performing a first STA on a circuit design, where the first STA includes performing a full delay calculation on the circuit design. As noted herein, for some embodiments, the first STA is the initial STA performed on the circuit design during a particular STA session. Additionally, for some embodiments, the full delay calculation of the first STA is an iterative process that comprises a first delay calculation iteration and a set of successive delay calculation iterations that follow the first delay calculation iteration. In such embodiments, the first delay calculation iteration may use an initial timing window to calculate delay timing of the circuit design, while each successive delay calculation iteration may use a timing window more refined than its preceding iteration to calculate delay timing of the circuit design.

Subsequent to the first STA being performed on the circuit design, the method 300 continues with operation 304 storing delay calculation data generated by the first STA performed on the circuit design at operation 302. The method 300 then continues with operation 306 performing a second STA on a first modified version of the circuit design, where the second STA includes performing a first non-full delay calculation on the first modified version of the circuit design based on the delay calculation data stored at operation 304. For some embodiments, operations 304 and 306 are respectively similar to operations 202 and 204 of the method 200 described above with respect to FIG. 2.

The method 300 continues with operation 308 updating the delay calculation data, stored at operation 304, based on second delay calculation data generated by the second STA. For some embodiments, the second delay calculation data comprises data generated by delay calculations the second STA performs on a set of invalidated stages of the modified version of the circuit design having at least one invalid pin or port. Updating the stored delay calculation data based on the second delay calculation data may involve modifying or replacing portions of the stored delay calculation data with related portions of the second delay calculation data. For instance, where first data was generated by a delay calculation performed on a first stage of the circuit design (operation 302) and subsequently stored (operation 304), second data generated by a delay calculation performed again on the first stage during operation 306 could replace or modify the first data in the stored delay calculation data during operation 308. In this way, the stored delay calculation data for each stage of the circuit design can be kept up to date after each STA run.

The method 300 continues with operation 310 performing a third STA on a second modified version of the circuit design, where the third STA includes performing a second non-full delay calculation on the second modified version of the circuit design based on the updated delay calculation data provided at operation 308. Similar to the second STA of operation 306, the third STA of operation 310 may represent the first time an STA is performed on the circuit design since the second STA was performed. Between the second STA and the third STA, the circuit design may be modified in a variety of ways described herein. Additionally, like operation 306, operation 310 may perform the non-full delay calculation on the modified version of the circuit design by performing delay calculations on a set of invalidated stages of the modified version of the circuit design having at least one invalid pin or port. For all remaining stages of the modified version of the circuit design, operation 310 may reuse the delay calculation data stored on a data storage device at operation 304 and updated at operation 308.

Subsequent to operation 310, the method 300 may continue to alternate between performing STAs and updating the stored delay calculation data accordingly. The method 300 may continue in this manner until the STA session has been closed (e.g., until signoff is achieved).

Figure 4:
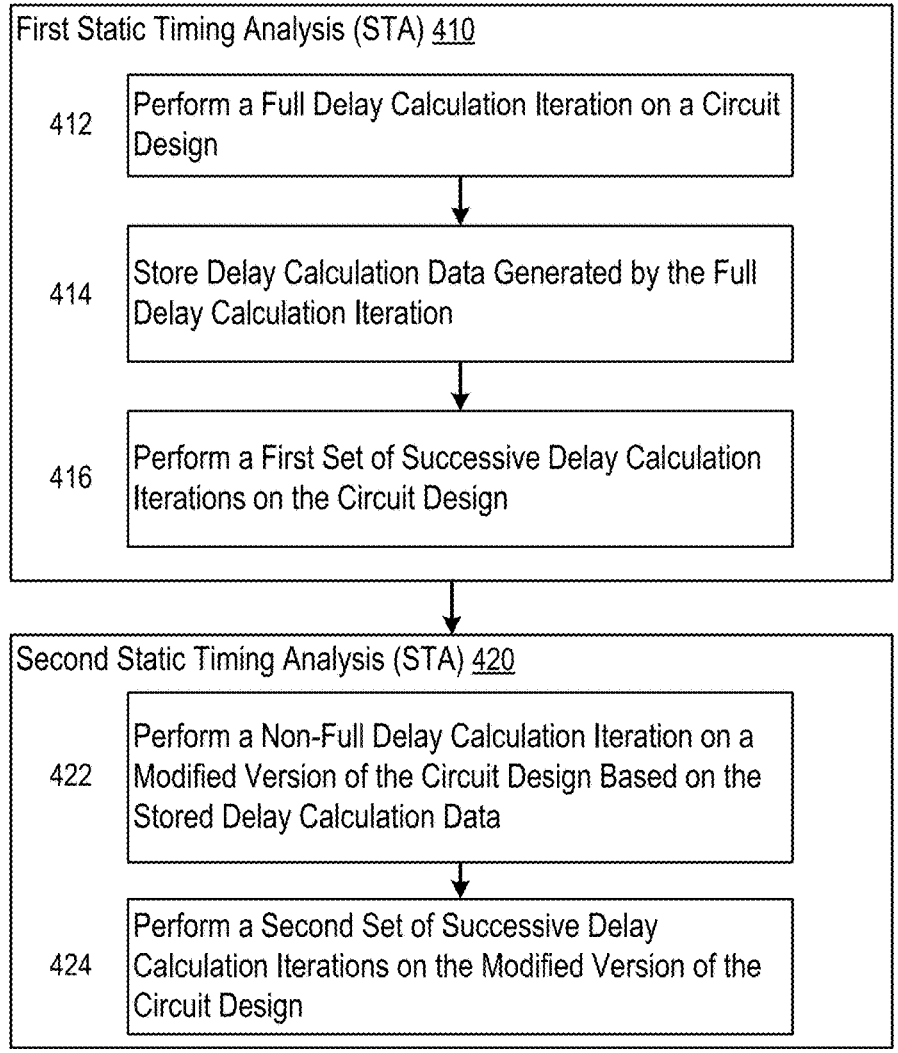

Referring now to FIG. 4, the flowchart illustrates an example method 400 for STA with reuse of prior delay calculation results, according to some embodiments. The method 400 may be performed as part of an STA session being performed on a circuit design by a timing analysis tool. An operation of the method 400 may be performed by a hardware processor of a computing device.

As shown, the method 400 begins with a first STA 410 performed on a circuit design, and eventually continues to a second STA 420 performed on a modified version of the circuit design. For some embodiments, the first STA 410 and second STA 420 are performed during a single STA session performed on the circuit design (e.g., as part of signoff verification). Between the first STA 410 and the second STA 420, the circuit design may be modified in a variety of ways, including, without limitation, application of a set of ECOs (e.g., to fix timing or recover leakage), or applications of different derate values (e.g., one for testing hold timing and another for testing setup timing).

During the first STA 410, multiple delay calculation iterations are performed on the circuit design. For each successive delay calculation iteration, a timing window used is refined and a delay calculation operation is performed. The result of the first STA 410 may be a full SI delay calculation for the entire circuit design. As shown, operation 412 of the first STA 410 performs a full delay calculation iteration on the circuit design. For some embodiments, the full delay calculation uses an infinite timing window for victims and aggressors in the circuit design.

The set of delays calculated at operation 412 may be annotated on a timing graph, which may be used to compute arrival and slack timing for the circuit design. As used herein, a timing graph may model timing of the circuit design to account for various process variables that can affect the timing. In particular, during timing analysis of a circuit design, a timing graph may be generated (e.g., extracted from the circuit design) as part of performing statistical static timing analysis (SSTA) on the circuit design. The timing graph can include timing arcs (e.g., delay arcs) between timing pins, each of which may have a statistical function of delay, slew, slack, or arrival time. The timing graph may be formed with delay distributions and slew distributions (probability density functions) for each node in the timing graph.

The first STA 410 continues with operation 414 storing delay calculation data generated by the full delay calculation iteration performed at operation 412. The delay calculation data generated at operation 412 can comprise a set of delay calculation values determined during operation 412. The set of delay calculation values determined can include, for instance, delay, slew, sensitivity, waveforms, and the like. The set of delay calculation values may be determined for each pin, arc, and view involved during timing analysis of the circuit design. According to some embodiments, the delay calculation data may be stored in a binary format, and may be stored according to a predetermined structure, such as the one illustrated by and described with respect to FIG. 9.

The first STA 410 continues with operation 416 performing a first set of successive delay calculation iterations on the circuit design. For some embodiments, each successive delay calculation iteration in the first set uses a set of delays computed in a previous iteration to compute a set of arrival times at all nodes of a timing graph; uses the set of arrival times to compute timing windows; and uses the computed timing windows (i.e., non-infinite timing windows) to perform a full delay calculation (e.g., SI delay calculation) on the circuit design. A set of calculated delays is annotated on the time graph for arrival and slack computation. These sets of delays calculated by the successive delay iterations may not be stored for use by future iterations. Once the delay, arrival, and slack are computed, a timing report may be generated (e.g., for review by a circuit designer).

Once timing reports are generated by the first STA 410, a circuit designer may review the generated timing reports and decide whether to sign off the circuit design, apply an update to the circuit design by an incremental ECO, or perform the second STA 420 as described below (e.g., for modified derate values or constraints).

Similar to the first STA 410, the second STA 420 performs multiple delay calculation iterations on the modified version of the circuit design. As shown, operation 422 of the second STA 420 performs a non-full delay calculation iteration on the modified version of the circuit design based on the delay calculation data stored at operation 414 of the first STA 410. For some embodiments, performing the non-full delay calculation on the modified version of the circuit design based on the delay calculation data comprises performing a delay calculation on a set of invalidated stages of the modified version of the circuit design having at least one invalid pin or port. For all remaining stages of the modified version of the circuit design, delay calculation data stored on a data storage device at operation 414 can be reused.

As noted herein, a stage of a circuit design invalidated by a modification may include at least one of: a first type of stage modified by an ECO process; a second type of stage in a fan-in of another stage modified by an ECO process; a third type of stage including a port or pin for which an input transition constraint is modified; a fourth type of stage coupled to a net of at least one of the first type of stage, the second type of stage, or the third type of stage; or a fifth type of stage in a fan-out (e.g., fan-out cone) of at least one of the first type of stage, the second type of stage, or the third type of stage. Additionally, for some embodiments, not all stages in the set of invalidated stages may need to be recomputed by a full delay calculation operation. For instance, for a stage of the fifth type (as described above) experiencing slew-stabilization (e.g., not experiencing a change in input slew), the delay calculation data stored at operation 414 may be used in place of re-computing the delay timing of the stage by performing a delay calculation.

For some embodiments, the non-full delay calculation iteration performed on a circuit design comprises checking for the presence of results from an earlier STA. The non-full delay calculation iteration may iterate over stages of the circuit design in the following manner. For each stage, the non-full delay calculation iteration may check if the stage is part of the set of invalidated stages and has a change input transition. If so, a delay calculation is performed on the stage. If not, results from the stored delay calculation data are used by the non-full delay calculation iteration (in place of performing the delay calculation). The non-full delay calculation iteration can annotate the results on the timing graph. If the stage was reanalyzed (i.e., delay calculation was performed on the stage), then the stored delay calculation data is updated.

The second STA 420 continues with operation 424 performing a second set of successive delay calculation iterations on the modified version of the circuit design. For some embodiments, operation 424 is similar to operation 416.

Figure 5:
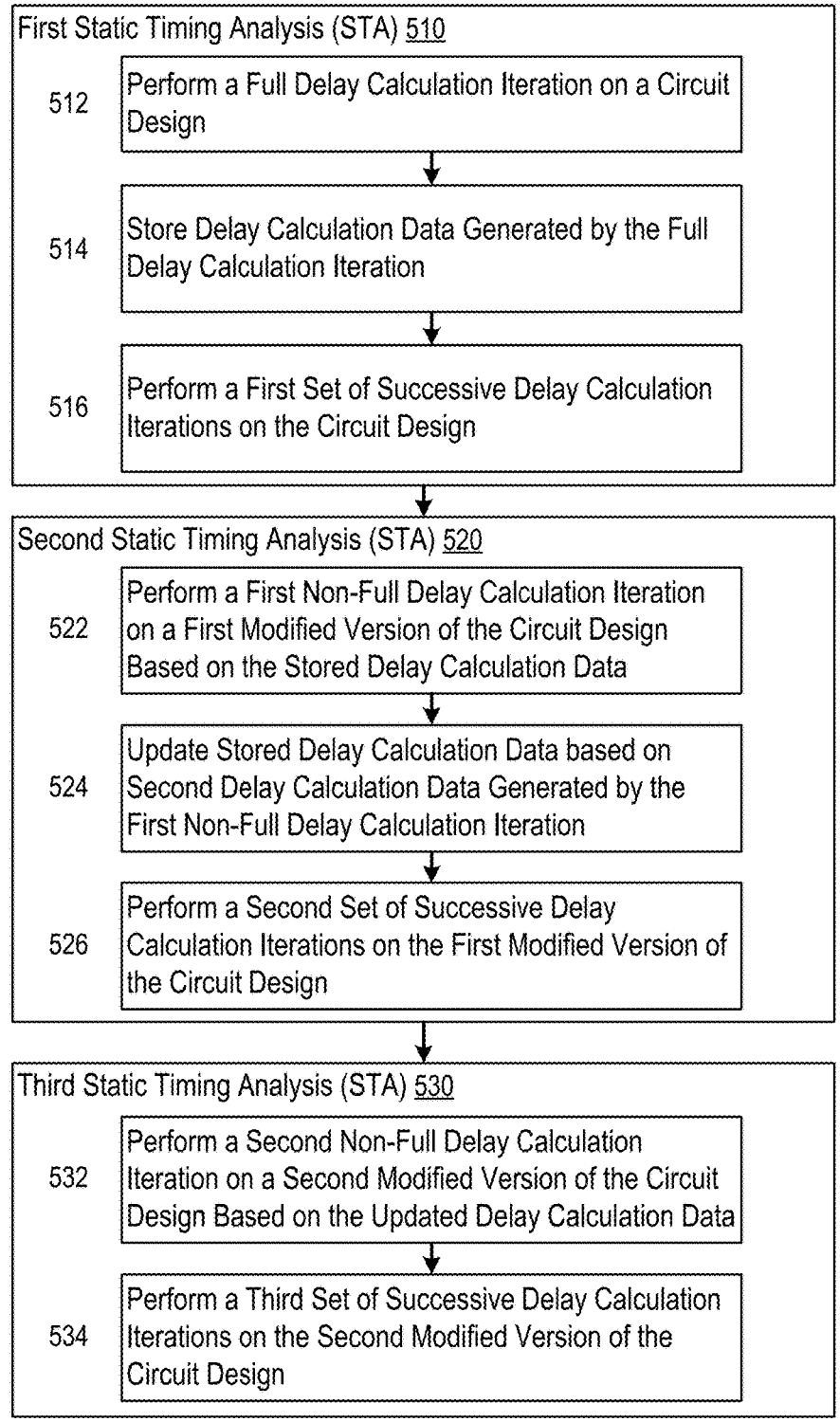

Referring now to FIG. 5, the flowchart illustrates an example method 500 for STA with reuse of prior delay calculation results, according to some embodiments. Similar to the method 400, the method 500 may be performed as part of an STA session being performed on a circuit design by a timing analysis tool. An operation of the method 500 may be performed by a hardware processor of a computing device.

As shown, the method 500 begins with a first STA 510 performed on a circuit design, continues to a second STA 520 performed on a first modified version of the circuit design, and eventually continues to a third STA 530 performed on a second modified version of the circuit design. For some embodiments, the first STA 510, second STA 520, and third STA 530 are performed during a single STA session performed on the circuit design (e.g., as part of signoff verification). Between pairs of STAs (e.g., the first and second STAs 510, 520 and the second and third STAs 520, 530), the circuit design may be modified by, for example, application of a set of ECOs, or applications of different derate values.

During the first STA 510, multiple delay calculation iterations are performed on the circuit design. As shown, operation 512 of the first STA 510 performs a full delay calculation iteration on the circuit design. The first STA 510 continues with operation 514 storing delay calculation data generated by the full delay calculation iteration performed at operation 512. The first STA 510 continues with operation 516 performing a first set of successive delay calculation iterations on the circuit design. For some embodiments, operations 512, 514, and 516 are respectively similar to operations 412, 414, and 416 of the method 400 described above with respect to FIG. 4.

Similar to the first STA 510, the second STA 520 performs multiple delay calculation iterations on the modified version of the circuit design. As shown, operation 522 of the second STA 520 performs a first non-full delay calculation iteration on the first modified version of the circuit design based on the delay calculation data stored at operation 514 of the first STA 510. As at operation 422 of the method 400, performing the first non-full delay calculation on the first modified version of the circuit design based on the delay calculation data can comprise performing a delay calculation on a set of invalidated stages of the first modified version of the circuit design having at least one invalid pin or port. For all remaining stages of the first modified version of the circuit design, delay calculation data, stored on a data storage device at operation 514, can be reused.

The second STA 520 continues with operation 524 updating the stored delay calculation data based on second delay calculation data generated by the first non-full delay calculation iteration performed at operation 522. The second delay calculation data generated at operation 522 can comprise a set of delay calculation values determined during operation 522. According to some embodiments, the delay calculation values determined during operation 522 are only determined for invalidated stages of the first modified version of the circuit design having at least one invalid pin or port, while the delay calculation values for all remaining stages of the first modified version are reused from the delay calculation data stored at operation 514. Accordingly, during operation 524, the stored delay calculation data may only be updated with new delay calculation values that are determined for the invalidated stages of the first modified version of the circuit design having at least one invalid pin or port. Portions of the stored delay calculation data representing data reused at operation 522 may remain unchanged at operation 524.

The second STA 520 continues with operation 526 performing a second set of successive delay calculation iterations on the first modified version of the circuit design. For some embodiments, operation 526 is similar to operation 424 of the method 400 as described above with respect to FIG. 4.

Similar to the first STA 510 and the second STA 520, the third STA 530 performs multiple delay calculation iterations on the second modified version of the circuit design. As shown, operation 532 of the third STA 530 performs a second non-full delay calculation iteration on the second modified version of the circuit design based on the updated delay calculation data provided at operation 524 of the second STA 520. The third STA 530 continues with operation 534 performing a third set of successive delay calculation iterations on the second modified version of the circuit design. For some embodiments, operations 532 and 534 are respectively similar to operations 522 and 526. Additionally, similar to the second STA 520, the third STA 530, and other successive STAs that follow, may also update the stored delay calculation data as described with respect to operation 524. In this way, successive STAs can continue to reuse and benefit from prior-determined delay calculation results.

Figure 6:
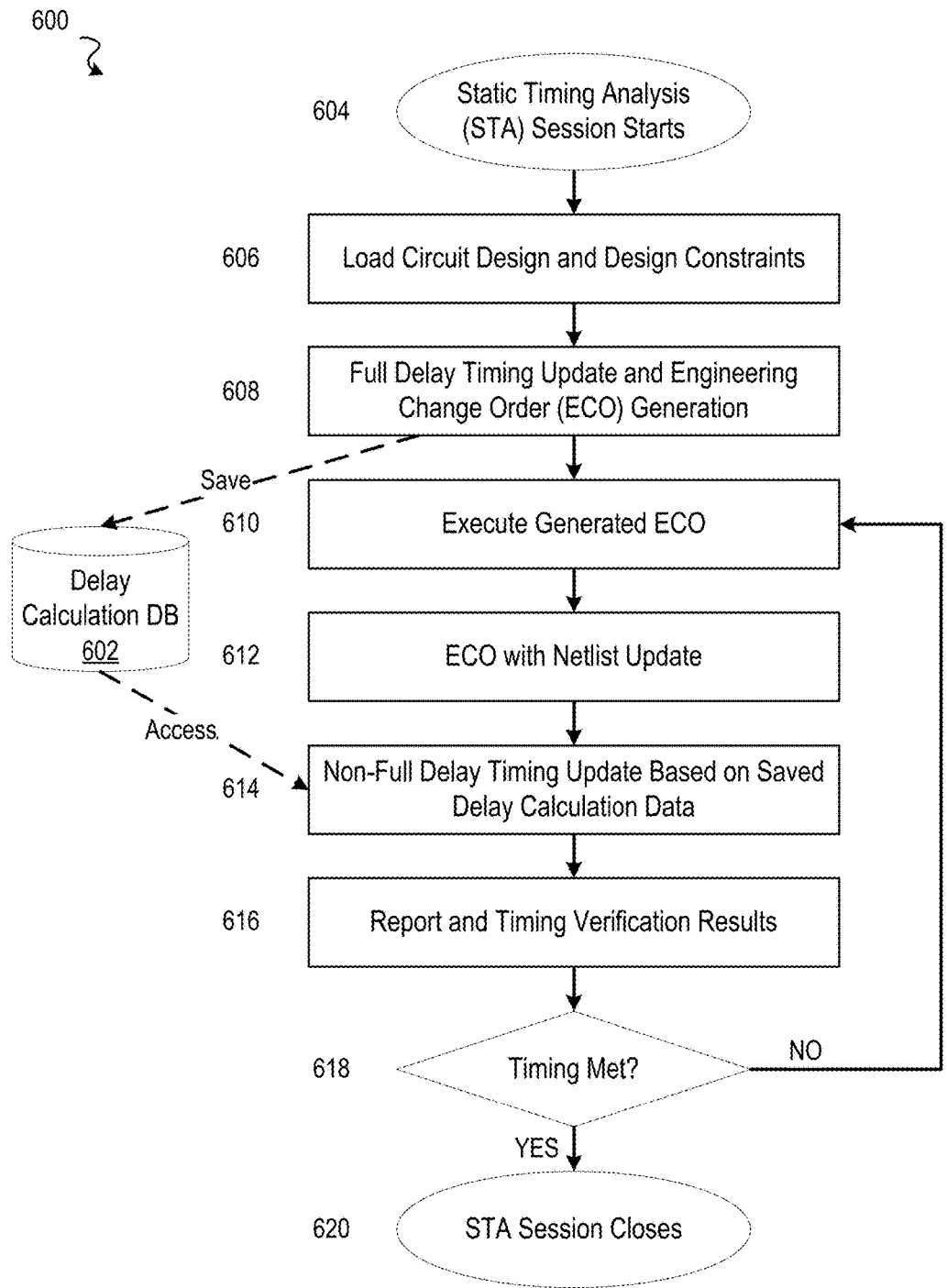
FIGS. 6 and 7 are flowcharts illustrating example scenarios that use STA with reuse of prior delay calculation results, according to some embodiments.

FIG. 6 is a flowchart illustrating an example scenario that uses STA with reuse of prior delay calculation results, according to some embodiments. In particular, the example scenario illustrates an STA session 600 involving ECOs and STA that reuses delay calculation results, in accordance with some embodiments. An ECO may be applied to a circuit design, for example, to address and fix timing violations and DRVs found in the circuit design.

As used herein, an ECO can comprise a process of inserting a logic adjustment to a netlist of the circuit design (e.g., via changes to all or metal-only layers of the circuit design) prior to the circuit design being provided for fabrication, which can avoid having to perform time-consuming synthesis, placement, clock-tree synthesis and routing operations. For instance, an ECO may be applied to a circuit design prior to the circuit design being provided for fabrication but after optimization of the circuit design by an EDA tool.

Generally, a set of timing/DRV ECOs for a circuit design may involve an ECO file being generated (e.g., including change_cell, add_repeater, or delete_repeater commands to implement logic changes) by an ECO software tool. Traditionally, to get a new timing of the circuit design based on application of the set of ECOs, an STA software tool could receive the ECO file to perform a set of delay timing calculations for the circuit design based on the ECOs, and then update the delay timing either incrementally (which can be inaccurate and slow for large numbers of ECO commands) or fully (which can provide more accurate post-ECO delay timing of the circuit design but is expensive in terms of runtime).

The STA session 600 of FIG. 6 illustrates how after an initial full delay calculation, an STA software tool, according to an embodiment, can replace the traditional performance of a full delay calculation or an incremental delay calculation with performance of a delay calculation operation that leverages (e.g., operates based on) data stored from previous delay calculation operations (e.g., starting with the initial full delay calculation).

As shown, the STA session 600 starts at operation 604. The STA session 600 continues to operation 606 loading a circuit design to be analyzed, and loading a set of design constraints associated with the circuit design. The STA session 600 continues with operation 608 fully updating the delay timing of the circuit design and generating a set of ECOs. The full delay timing update may comprise a full delay timing calculation, and the ECO generation may involve generation of an ECO file by an ECO software tool. As part of operation 608, results from the full delay calculation, which may include delay information, slew information, sensitivity information, or waveform information, are stored on a delay calculation database (DB) 602 as delay calculation data.

The STA session 600 continues with operation 610 executing the set of ECOs generated at operation 608 by an STA software tool in accordance with some embodiments. Executing the set of generated ECOs may comprise executing an ECO file containing commands relating to a set of generated ECOs to be applied to the circuit design. The STA session 600 continues with operation 612 generating a set of ECOs with netlist updates.

The STA session 600 continues with operation 614 non-fully updating the delay timing of a modified version of the circuit design based on the delay calculation data accessed from the delay calculation DB 602. The modified version of the circuit design is based on the set of ECOs and netlist updates generated at operation 612.

The STA session 600 continues with operation 616 providing a report and timing verification results based on the non-full delay timing calculation performed at operation 614. The STA session 600 continues with operation 618 determining whether a timing expectation for the circuit design is met. If the timing expectation (e.g., timing requirement) for the circuit design is met, the STA session 600 proceeds to operation 620. If the timing expectation is not met, operation 610 is repeated with execution of a set of generated ECOs. Eventually, the STA session 600 closes at operation 620, which may represent a final signoff of the circuit design before it is provided for fabrication.

Figure 7:
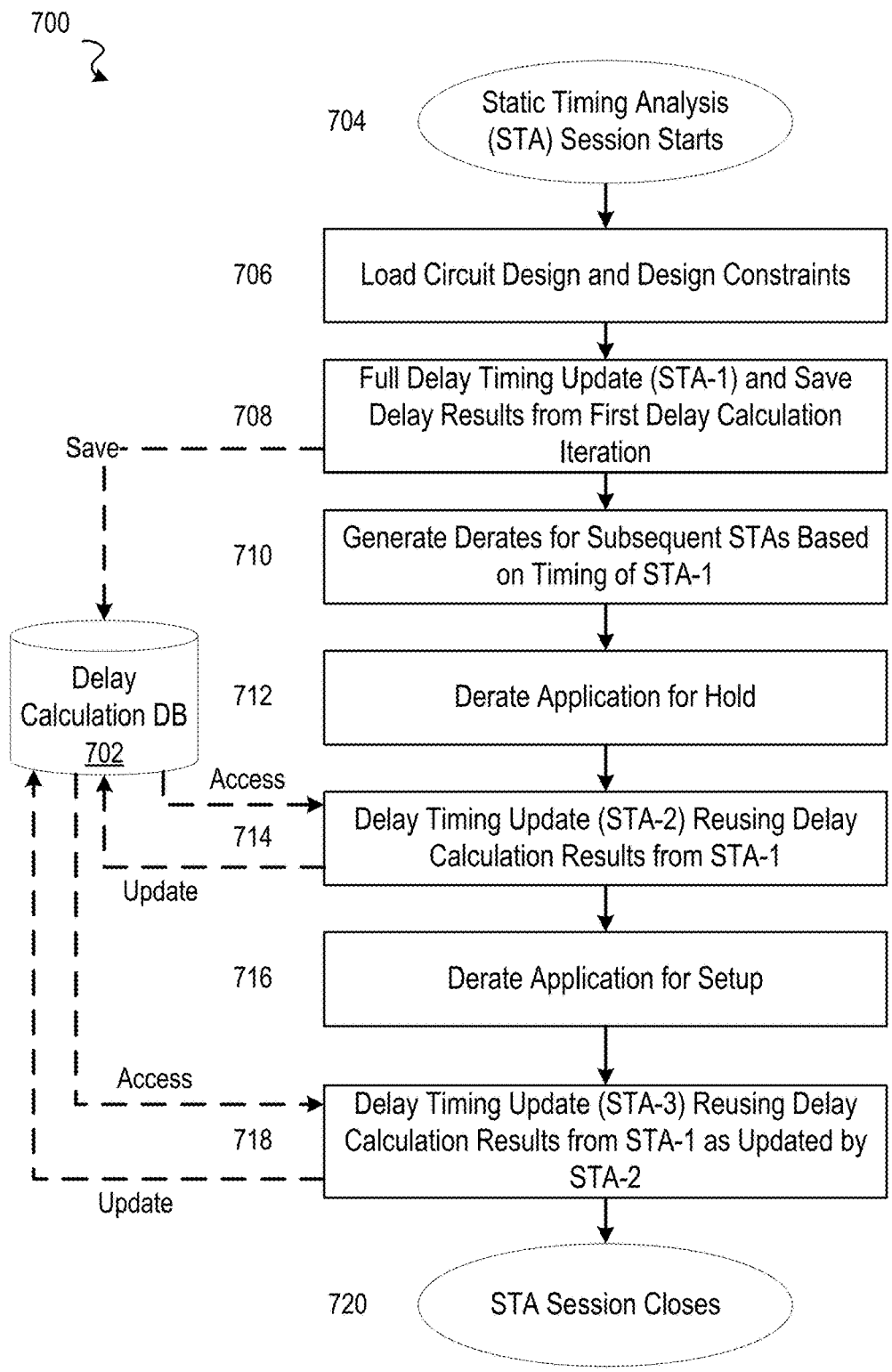

FIG. 7 is a flowchart illustrating an example scenario that uses STA with reuse of prior delay calculation results, according to some embodiments. In particular, the example scenario illustrates a portion of an STA session 700 involving derating a circuit design and performing STA runs that reuse delay calculation in accordance with some embodiments. Generally, different derates assist in ensuring that a circuit design will operate as desired while accounting for fabrication process variations. As noted herein, a derate value may be applied to a circuit design, for example, to analyze the timing of the circuit design for testing hold timing, setup timing, and particular instance/net timing.

As shown, the STA session 700 starts at operation 704. The STA session 700 continues with operation 706 loading a circuit design to be analyzed, and loading a set of design constraints associated with the circuit design. The STA session 700 continues with operation 708 fully updating the delay timing of the circuit design during a first STA run (STA-1), and saving results from the first delay calculation iteration performed during STA-1 to a delay calculation database (DB) 702. The full delay timing update may comprise a full delay timing calculation.

The STA session 700 continues with operation 710 generating, for subsequent STA runs, a set of derates (e.g., derate values for hold or for setup) based on the timing data generated by STA-1. The STA session 700 continues with operation 712 applying a derate value to the circuit design to test for hold timing. The STA session 700 continues with operation 714 non-fully updating timing of a version of the circuit design modified by the hold derate value of operation 712; the non-full timing update of this modified version of the circuit design is performed during a second STA run (STA-2). The non-full timing update of STA-2 reuses the delay calculation results of STA-1 accessed from the delay calculation DB 702. During operation 714, the delay calculation results of STA-2 are used to update the delay calculation data stored on the delay calculation DB 702.

The STA session 700 continues with operation 716 applying a derate value to the circuit design to test for setup timing. The STA session 700 continues with operation 718 non-fully updating timing of a version of the circuit design modified by the setup derate value of operation 716; the non-full timing update of this modified version of the circuit design is performed during a third STA run (STA-3). The non-full timing update of STA-3 reuses the delay calculation results of STA-1 as updated by STA-2; the delay calculation results are accessed from the delay calculation DB 702. During operation 718, the delay calculation results of STA-3 are used to update the delay calculation data stored on the delay calculation DB 702. Eventually, the STA session 700 closes at operation 720, which can represent a final signoff of the circuit design before it is provided for fabrication.

Figure 8:
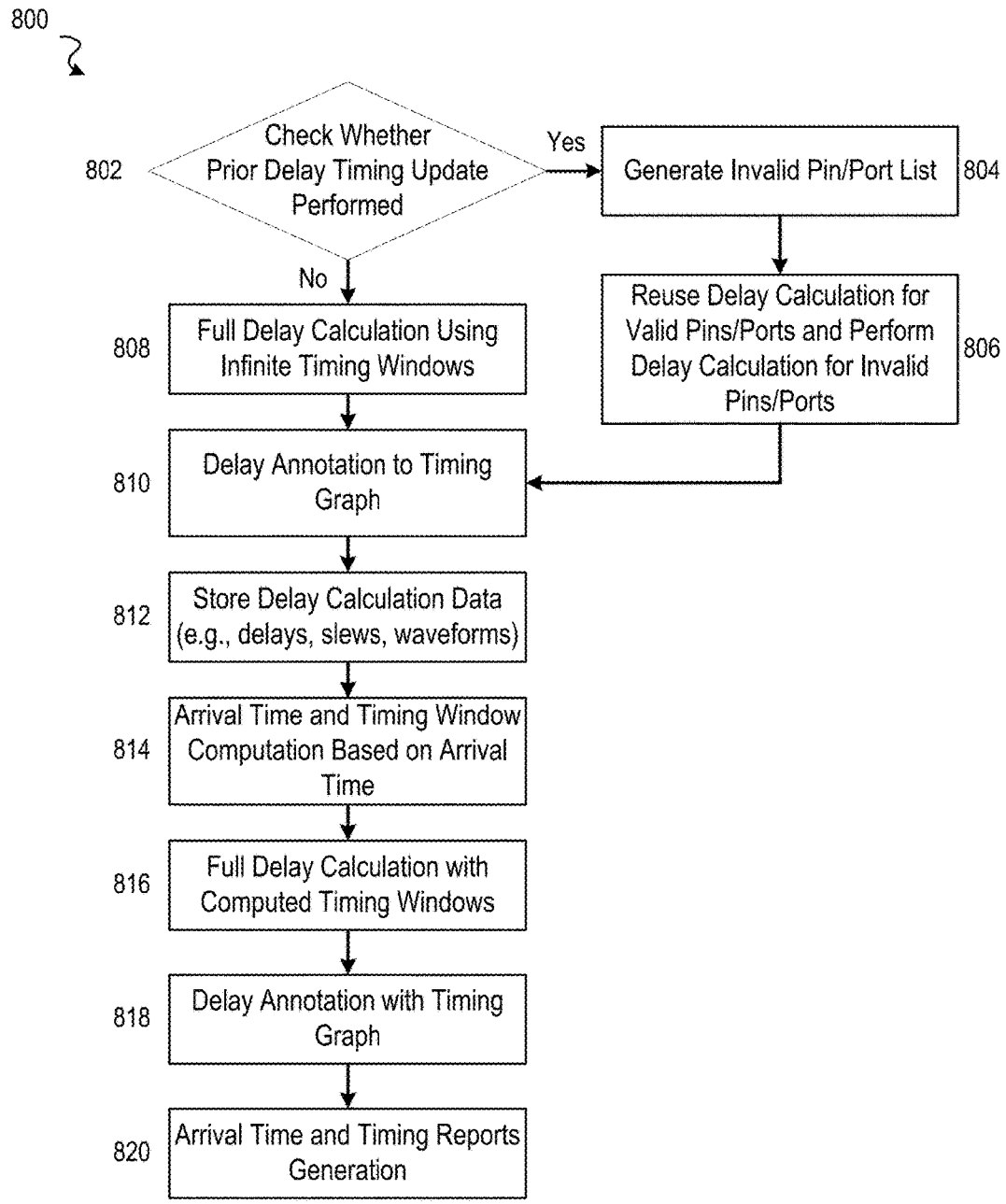
FIG. 8 is a flowchart illustrating an example method for STA with reuse of prior delay calculation results, according to some embodiments.

FIG. 8 is a flowchart illustrating an example method 800 for STA with reuse of prior delay calculation results, according to some embodiments. In particular, the method 800 involves STA with delay calculation data reuse and multiple delay calculation runs being performed based on different timing windows. The method 800 may be performed during an STA session with respect to a circuit design.

As shown, the method 800 starts with operation 802 checking whether a prior delay timing update (involving a delay timing calculation) was performed for a circuit design. Operation 802 may perform this check by determining whether data generated by a prior delay timing update is available for use (e.g., stored on a data storage device).

If a prior delay timing update is detected, the method 800 continues from operation 802 with operation 804, which generates a list of invalid pins or ports for the circuit design. As described herein, a list of pins or ports of the circuit design may be invalidated by a design modification implemented since the prior delay timing update. From operation 804, the method 800 continues with operation 806 reusing prior delay calculation results for valid pin/ports of the circuit design (i.e., those not on the list of invalid pins or ports), and performing delay calculations for each pin/port on the list of invalid pins/ports of the circuit design. From operation 806, the method 800 continues to operation 810, which based on the results of operation 806 (i.e., reusing prior delay calculation results and performing delay calculations on invalid pins/ports), applies a set of delay annotations to a timing graph generated for time analyzing the circuit design. The method 800 continues with operation 812 storing delay calculation data (e.g., delays, slews, waveforms, etc.), from the results of operation 806, for future usage as described herein.

If a prior delay timing update is not detected at operation 802, the method 800 continues from operation 802 to operation 808, which performs a full delay calculation using infinite timing windows. From operation 808, the method 800 continues to operation 810, which based on results of the full delay calculation performed at operation 808, applies a set of delay annotations to a timing graph generated for time analyzing the circuit design. From operation 810, the method 800 continues with operation 812 storing delay calculation data (e.g., delays, slews, waveforms, etc.), from the results of operation 808, for future usage as described herein.

The method 800 continues with operation 814 determining a set of arrival times based on the set of timing graphs annotated at operation 810, and computing a set of timing windows based on the arrival times. The method 800 continues with operation 816 performing full delay calculation with the set of timing windows computed at operation 814. The method 800 then continues with operation 818 applying a set of delay annotations, based on the full delay calculation performed at operation 816, to the timing graph generated for time analyzing the circuit design. As shown, the method 800 ends with operation 820 determining a set of arrival times and generating a set of timing reports based on the set of timing graphs annotated at operation 818.

Figure 9:
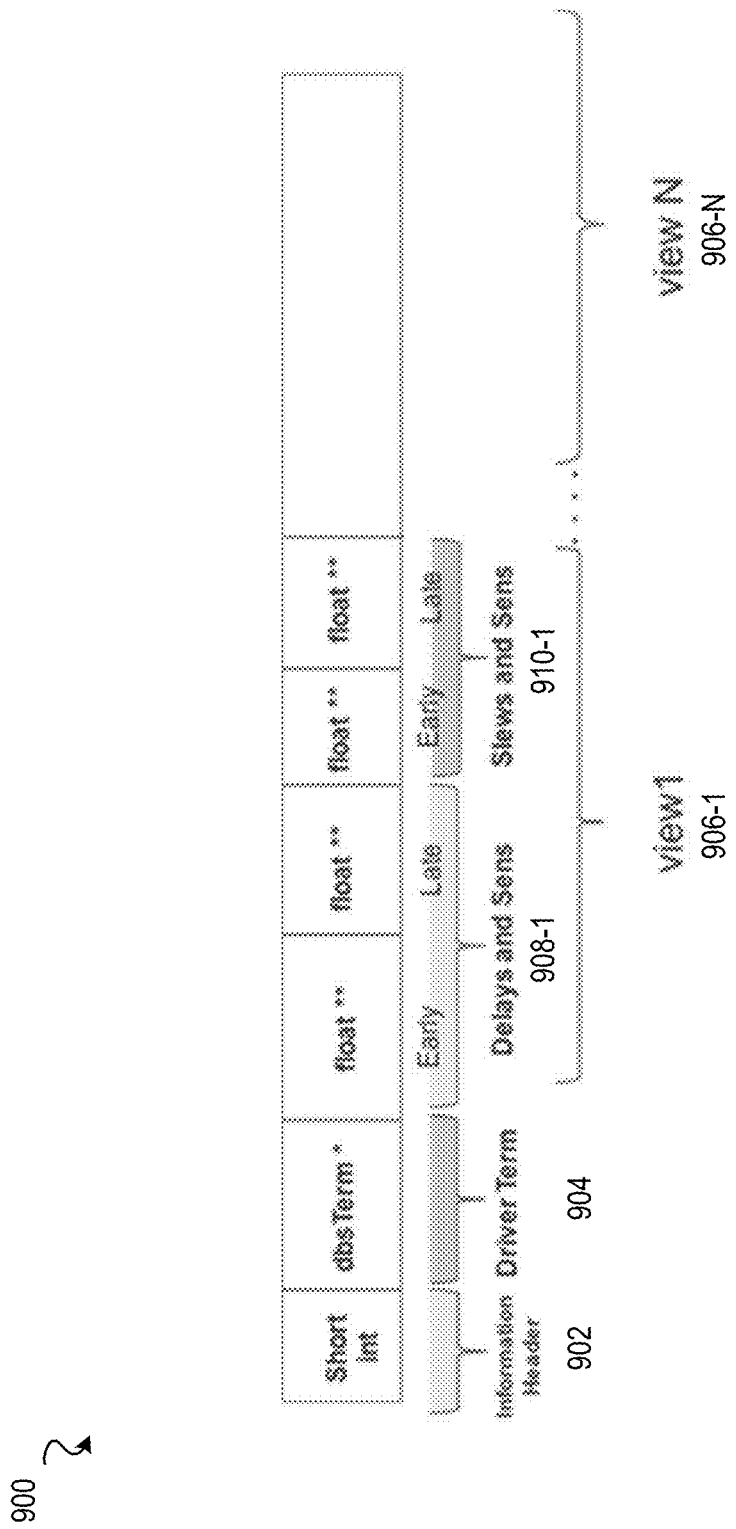
FIG. 9 is a diagram illustrating an example data format for storing delay calculation data, in accordance with some embodiments.

FIG. 9 is a diagram illustrating an example data format 900 for storing delay calculation data, in accordance with some embodiments. Depending on the embodiment, delay calculation data may be stored in a database or flat file using the data format 900 illustrated. The data format utilized can vary among embodiments. According to various embodiments, the delay calculation data describes a set of results generated by previous delay calculations (e.g., SI delay calculations) that were performed during an STA run on a circuit design. Examples of data provided by the delay calculation data include, for instance, slew information (e.g., delay slew values), sensitivity information (e.g., sensitivity values for delays or slew), and waveform information (e.g., waveform data points). Such information can be generated and stored for each pin of the circuit design and for each view (e.g., a given set of conditions under which the circuit design is analyzed, such as mode and corner). Some or all of the delay calculation data may be stored in a binary format in accordance with the data format 900.

As shown, the data format 900 comprises an information header field 902, a driver term field 904, and field sets 906-1 through 906-N for each view 1 through N. The information header field 902 comprises a short integer value, which can distinguish an entry and associate it with a particular pin of the circuit design. The driver term field 904 comprises a decibel value that can define the strength of a driver in the circuit design. For each view I, the field set 906-I comprises a delay field set 908-N and a slew field set 910-I. The delay field set 908-I can provide early and late values that represent the delays and delay sensitivities that resulted for a pin of the circuit design during delay calculation under view I. Similarly, the slew field set 910-I can provide early and late values that represent the slew and slew sensitivities that resulted for a pin of the circuit design during delay calculation under view I.

Figure 10:
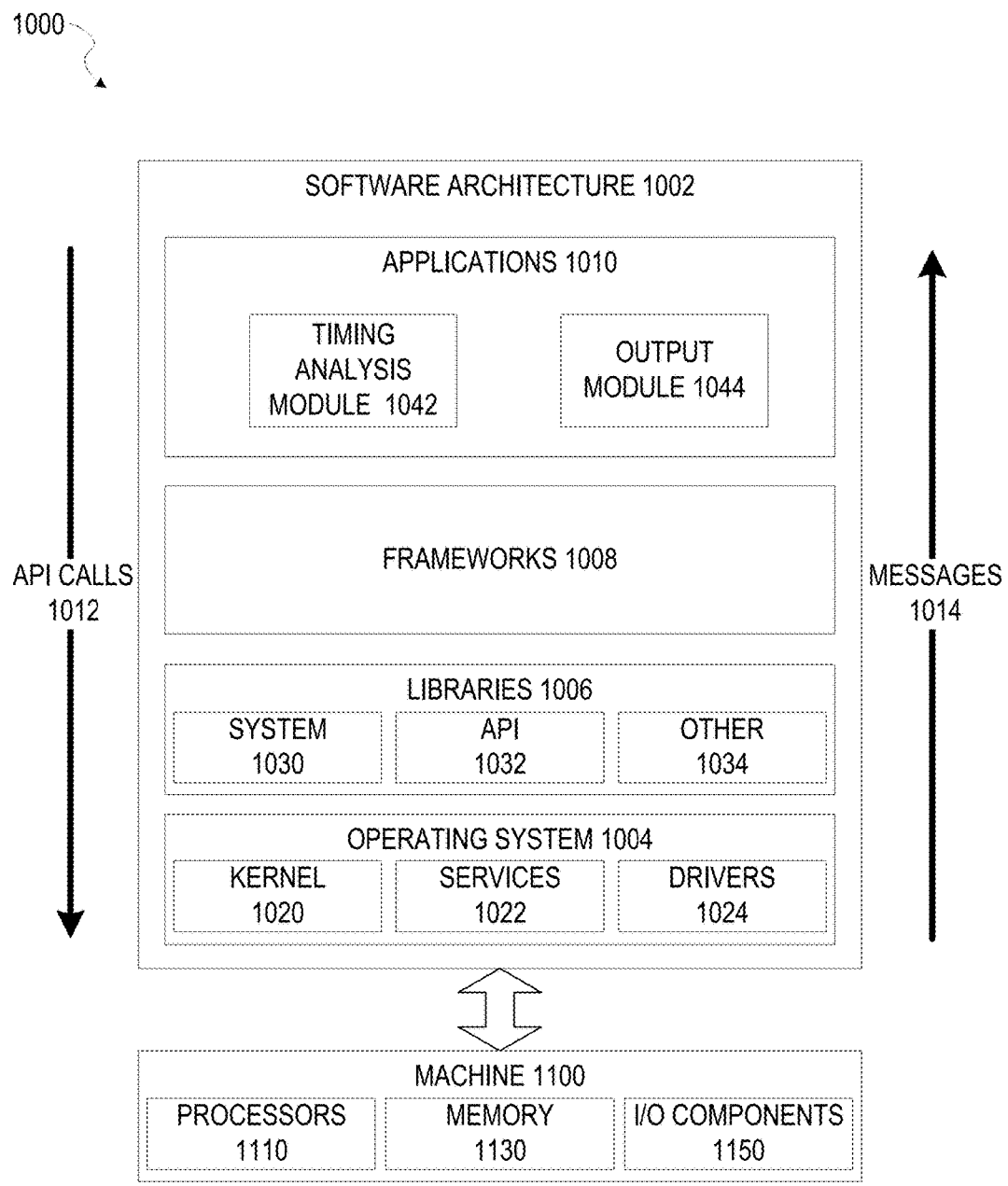
FIG. 10 is a block diagram illustrating an example of a software architecture that may be operating on an electronic design automation (EDA) computing device and may be used with methods for STA with reuse of prior delay calculation results, according to some embodiments.

FIG. 10 is a block diagram 1000 illustrating an example of a software architecture 1002 that may be operating on an EDA computer and may be used with methods for reusing delay calculation in static timing analysis, according to some example embodiments. The software architecture 1002 can be used as an EDA computing device to implement any of the methods described above. Aspects of the software architecture 1002 may, in various embodiments, be used to store circuit designs and execute timing analysis or optimization in an EDA environment to generate circuit designs, with physical devices generated using these circuit designs.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, any server computer of a server system, or any other device described herein may operate using elements of the software architecture 1002. An EDA computing device described herein may additionally be implemented using aspects of the software architecture 1002, with the software architecture 1002 adapted for operating to perform STA with reuse of prior delay calculation results in any manner described herein.

In one embodiment, an EDA application of the applications 1010 performs STA according to embodiments described herein using various modules within the software architecture 1002. For example, in one embodiment, an EDA computing device similar to the machine 1100 includes the memory 1130 and the one or more processors 1110. The processors 1110 also implement a timing analysis module 1042 to process design input files to perform delay timing calculations on a circuit design, to store the calculation results, to reuse at least some of the stored results during subsequent delay timing calculations performed on the circuit design, and to output timing reports.

A processor-implemented output module 1044 may then be used to update a display of the I/O components 1150 of the EDA computing device with data associated with the set of timing analysis results.

In various other embodiments, rather than being implemented as modules of the one or more applications 1010, some or all of the modules 1042 and 1044 may be implemented using elements of the libraries 1006, the operating system 1004, or the frameworks 1008.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and view definition files are examples that may operate within the software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors or processor-implemented modules are distributed across a number of geographic locations.

Figure 11:
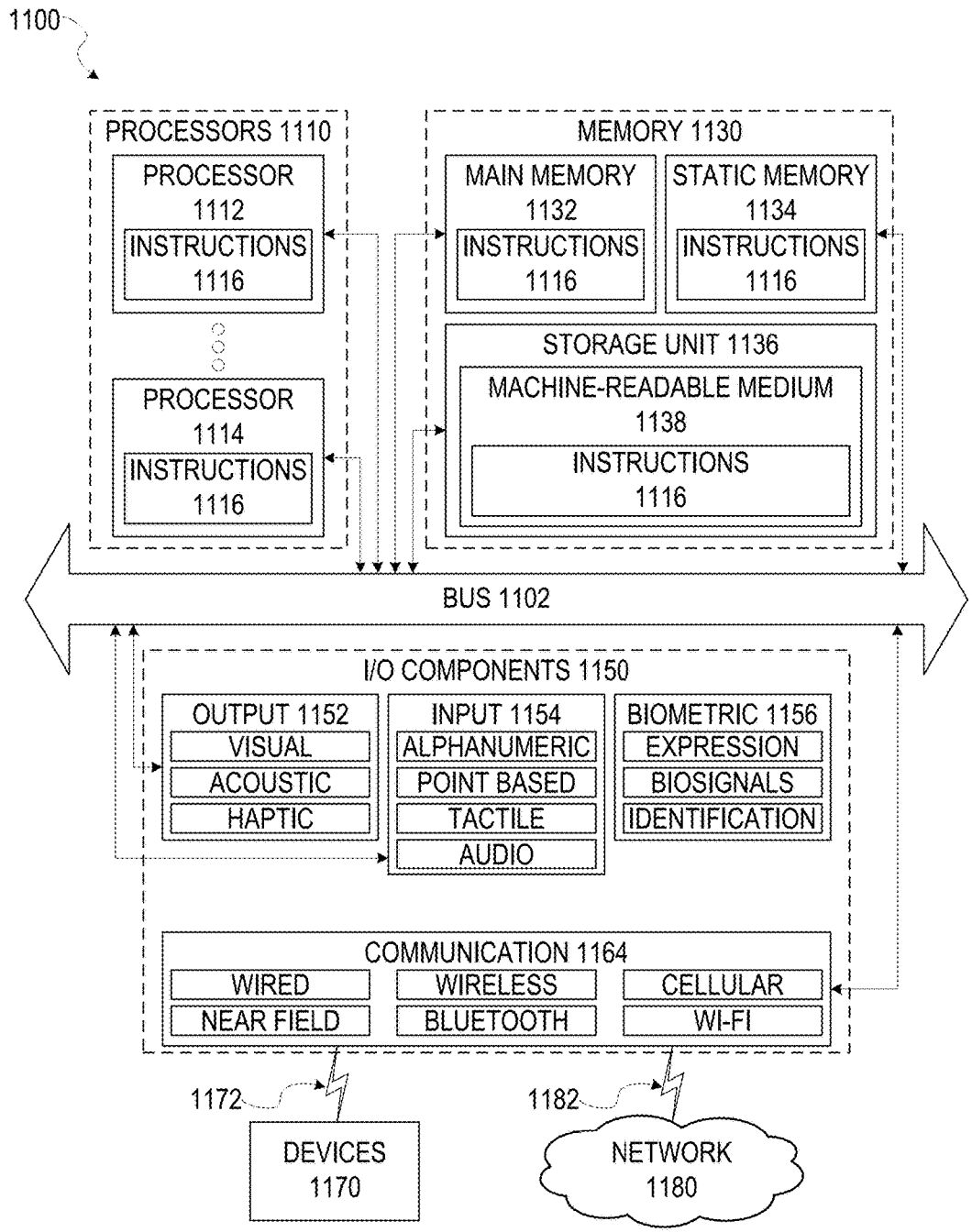
FIG. 11 is a diagram representing a machine in the form of a computer system within which a set of instructions are executed, causing the machine to perform any one or more of the methods discussed herein, according to some example embodiments.

FIG. 11 is a diagrammatic representation of the machine 1100 in the form of a computer system within which a set of instructions may be executed for causing the machine 1100 to perform any one or more of the methodologies discussed herein, according to an example embodiment. FIG. 11 shows components of the machine 1100, which is, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine (e.g., processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data-transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to" or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
    storing, to a data storage device, delay calculation data generated by a first static timing analysis (STA) performed on a circuit design, the first STA including performing a full delay calculation on the circuit design; and
    performing, using a hardware processor, a second STA on a modified version of the circuit design, the second STA including performing a non-full delay calculation on the modified version of the circuit design based on the delay calculation data stored on the data storage device by:
        determining a new delay calculation value for at least one invalidated stage of the modified version of the circuit design; and
        reusing the delay calculation data in place of performing a delay calculation on at least one valid stage of the modified version of the circuit design, the delay calculation data comprising at least one delay calculation value.

2. The method of claim 1, comprising performing, using the hardware processor, the first STA on the circuit design.

3. The method of claim 1, wherein performing the non-full delay calculation on the modified version of the circuit design based on the delay calculation data stored on the data storage device comprises:
    performing a delay calculation on a set of invalidated stages of the modified version of the circuit design having at least one invalid pin or port; and
    reusing the delay calculation data, stored on the data storage device, for all remaining stages of the modified version of the circuit design.

4. The method of claim 3, comprising, after the first STA, identifying the set of invalidated stages.

5. The method of claim 3, wherein the set of invalidated stages includes at least one of:
    a first type of stage modified by an engineering change order (ECO) process;
    a second type of stage in a fan-in of another stage modified by an ECO process;
    a third type of stage including a port or pin for which an input transition constraint is modified;
    a fourth type of stage coupled to a net of at least one of the first type of stage, the second type of stage, or the third type of stage;
    or a fifth type of stage in a fan-out of at least one of the first type of stage, the second type of stage, or the third type of stage.

6. The method of claim 1, comprising:
    updating the delay calculation data, stored on the data storage device, based on second delay calculation data generated by the second STA; and
    performing a third STA on a second modified version of the circuit design, the third STA including performing a second non-full delay calculation on the second modified version of the circuit design based on the updated delay calculation data.

7. The method of claim 1, wherein the delay calculation data comprises at least one of driver information, delay information, slew information, sensitivity information, or waveform information for a pin of the circuit design.

8. A device comprising:
    a memory configured to store delay calculation data; and
    a hardware processor communicatively coupled to the memory and configured to:
        perform a first static timing analysis (STA) on a circuit design, the first STA including:
            performing a full delay calculation iteration on the circuit design;

storing, to the memory, delay calculation data generated by the full delay calculation iteration; and
performing a first set of successive delay calculation iterations on the circuit design; and
perform a second STA on a modified version of the circuit design, the second STA including:
performing a non-full delay calculation iteration on the modified version of the circuit design based on the delay calculation data stored on the memory by:
determining a new delay calculation value for at least one invalidated stage of the modified version of the circuit design; and
reusing the delay calculation data in place of performing a delay calculation on at least one valid stage of the modified version of the circuit design, the delay calculation data comprising at least one delay calculation value; and
performing a second set of successive delay calculation iterations on the modified version of the circuit design.

9. The device of claim 8, the second STA including updating the delay calculation data, stored on the memory, based on second delay calculation data generated by the non-full delay calculation iteration, the hardware processor being configured to perform a third STA on a second modified version of the circuit design, the third STA including:
performing a second non-full delay calculation iteration on the circuit design based on the updated delay calculation data; and
performing a third set of successive delay calculation iterations on the second modified version of the circuit design.

10. The device of claim 8, wherein the full delay calculation iteration uses an infinite timing window, and the first set of successive delay calculation iterations uses a non-infinite timing window computed based on a set of delays generated by the full delay calculation iteration.

11. The device of claim 8, wherein the modified version of the circuit design is generated by applying an engineering change order (ECO) update to the circuit design.

12. The device of claim 8, wherein the modified version of the circuit design is generated by modifying a derate value associated with the circuit design.

13. The device of claim 8, wherein the modified version of the circuit design is generated by modifying a constraint value associated with the circuit design.

14. The device of claim 8, wherein the delay calculation data comprises at least one of driver information, delay information, slew information, sensitivity information, or waveform information for a pin of the circuit design.

15. A non-transitory computer-readable medium comprising instructions that, when executed by a hardware processor of a device, cause the device to perform operations comprising:
performing a first static timing analysis (STA) on a circuit design, the first STA including performing a full delay calculation on the circuit design;
storing, to a data storage device, delay calculation data generated by the first STA; and
performing a second STA on a modified version of the circuit design, the second STA including performing a non-full delay calculation on the modified version of the circuit design based on the delay calculation data stored on the data storage device by:
determining a new delay calculation value for at least one invalidated stage of the modified version of the circuit design; and
reusing the delay calculation data in place of performing a delay calculation on at least one valid stage of the modified version of the circuit design, the delay calculation data comprising at least one delay calculation value.

16. The non-transitory computer-readable medium of claim 15, wherein performing the non-full delay calculation on the modified version of the circuit design based on the delay calculation data stored on the data storage device comprises:
performing a delay calculation on a set of invalidated stages of the modified version of the circuit design having at least one invalid pin or port; and
reusing the delay calculation data, stored on the data storage device, for all remaining stages of the modified version of the circuit design.

17. The non-transitory computer-readable medium of claim 16, wherein the instructions cause the device to perform operations comprising, after the first STA, identifying the set of invalidated stages.

18. The non-transitory computer-readable medium of claim 16, wherein the set of invalidated stages includes at least one of:
a first type of stage modified by an engineering change order (ECO) process;
a second type of stage in a fan-in of another stage modified by an ECO process;
a third type of stage including a port or pin for which an input transition constraint is modified;
a fourth type of stage coupled to a net of at least one of the first type of stage, the second type of stage, or the third type of stage; or
a fifth type of stage in a fan-out of at least one of the first type of stage, the second type of stage, or the third type of stage.

19. The non-transitory computer-readable medium of claim 15, wherein the instructions cause the device to perform operations comprising:
updating the delay calculation data, stored on the data storage device, based on second delay calculation data generated by the second STA; and
performing a third STA on a second modified version of the circuit design, the third STA including performing a second non-full delay calculation on the second modified version of the circuit design based on the updated delay calculation data.

20. The non-transitory computer-readable medium of claim 15, wherein the delay calculation data comprises at least one of driver information, delay information, slew information, sensitivity information, or waveform information for a pin of the circuit design.

* * * * *